United States Patent [19]

Eida et al.

[11] Patent Number: 4,804,411

[45] Date of Patent: Feb. 14, 1989

[54] RECORDING LIQUID

[75] Inventors: Tsuyoshi Eida, Yokohama; Yuko Suga, Tokyo; Katsuhiro Shirota, Hiratsuka, all of Japan

[73] Assignee: Canon Kabushiki Kaisha, Tokyo, Japan

[21] Appl. No.: 14,783

[22] Filed: Feb. 13, 1987

[30] Foreign Application Priority Data

Feb. 17, 1986 [JP] Japan ................................. 61-30896
Feb. 17, 1986 [JP] Japan ................................. 61-30898
Apr. 18, 1986 [JP] Japan ................................. 61-88170
Apr. 18, 1986 [JP] Japan ................................. 61-88171

[51] Int. Cl.$^4$ ............................................. C09D 11/00
[52] U.S. Cl. ..................................... 106/22; 534/805; 534/806; 534/815
[58] Field of Search .................. 106/22; 534/806, 816, 534/805, 806, 815

[56] References Cited

U.S. PATENT DOCUMENTS

| | | | |
|---|---|---|---|
| 4,391,639 | 7/1983 | Kobayashi | 106/22 |
| 4,395,288 | 7/1983 | Eida | 106/22 |
| 4,426,226 | 1/1984 | Ohta | 106/22 |
| 4,557,761 | 12/1985 | Kobayashi | 106/22 |
| 4,620,875 | 11/1986 | Shimada | 106/22 |
| 4,632,703 | 12/1986 | Koike | 106/22 |
| 4,661,158 | 4/1987 | Kobayashi | 106/22 |

FOREIGN PATENT DOCUMENTS

| | | |
|---|---|---|
| 0146747 | 7/1985 | European Pat. Off. . |
| 3129955 | 4/1982 | Fed. Rep. of Germany . |
| 3512836 | 10/1985 | Fed. Rep. of Germany . |
| 57-209971 | 12/1982 | Japan . |
| 57-209971 | 12/1982 | Japan . |
| 58-176277 | 10/1983 | Japan . |
| 58-222165 | 12/1983 | Japan . |
| 59-213776 | 12/1984 | Japan . |
| 61-101571 | 5/1986 | Japan . |
| 1292278 | 4/1969 | Netherlands . |

OTHER PUBLICATIONS

Solomons, T. W. Graham, *Organic Chemistry*, 2nd Edition, John Wiley and Sons, p. 835.

*Primary Examiner*—Paul Lieberman
*Assistant Examiner*—Christine A. Skane
*Attorney, Agent, or Firm*—Fitzpatrick, Cella, Harper & Scinto

[57] ABSTRACT

A recording liquid comprising a solution of a recording agent is provided. The recording agent has a structure containing a plural number of structural units linked together through a linking group or groups. The structural unit may be a dye residue.

11 Claims, No Drawings

RECORDING LIQUID

BACKGROUND OF THE INVENTION

1. Field of the Invention

This invention relates to a novel recording liquid (hereinafter referred to as ink), particularly an ink suitable for a system in which recording is performed by ejecting the ink from fine ejection outlets (ejection orifices) provided at the recording head and permitting the ink to fly as liquid droplets.

2. Description of the Prior Art

For writing implements (fountain pens, felt pens, etc.) for performing recording on a recording medium such as paper, solutions of various dyes dissolved in water or other organic solvents have been used in the prior art.

Also in the so-called ink jet system in which the ink within the recording head is ejected from ejection orifices by action of a piezoelectric vibrator or by electrostatic attraction caused by application of high voltage, etc., inks comprising various dyes dissolved in water or organic solvents have been used. However, as compared with inks for use in stationary such as a fountain pen or a felt pen, the ink for ink jet is demanded to have characteristics to meet further strict conditions.

Such an ink jet system performs recording by permitting droplets of the so-called ink to fly and by attaching them onto a recording medium. Such an ink comprises a recording agent (a dye or a pigment) and a liquid medium for dissolving or dispersing the agent (water or an organic solvents, or their mixture) as the basic components, optionally containing an additive added therein.

In the prior art, as such a kind of ink, for example, there have been known solutions or dispersions of various dyes or pigments in aqueous or non-aqueous solvents as disclosed in Japanese Patent Publication Nos. 8361/1975, 40484/1976, 13126/1977 and 13127/1977 and Japanese Patent Laid-open Publication No.95008/1975. Preferable characteristics of this kind of ink may include the following:

(1) the ink should have the properties of liquid (viscosity, surface tension, electroconductivity, etc.) matching to the ejection conditions (driving voltage, driving frequency of piezoelectric element, shape and material of orifice, orifice diameter, etc.);

(2) the ink should be stable during storage for a long term so as not to cause clogging of fine ejection outlets or capillary pores;

(3) the ink should be fixed rapidly onto a recording medium (paper, film, etc.) with smooth circumference of ink dots and little feathering;

(4) the ink should give a printed image with sharp tone and high optical density;

(5) the ink should give a printed image excellent in fastness such as water resistance, light resistance, etc.;

(6) the ink should not corrode materials coming into contact with the ink (the vessel, the connecting tube, the sealing material, etc.);

(7) the ink should be excellent in safety such as from odor, toxicity, inflammability, etc.;

(8) the ink should be stable to heat for the use in the device as described above in which liquid droplets are generated by giving thermal energy to the recording liquid; etc.

It is considerably difficult to satisfy such various characteristics as mentioned above at the same time. The prior art as described above was unsatisfactory in this respect.

Since the ink to be applied to recording for such purpose is composed basically of a dye and its liquid medium, the above ink characteristics will be greatly governed by the inherent properties of the dye. Accordingly, the selection of a dye having the above characteristics is an extremely important technique in this field of art.

Particularly, it is extremely difficult to select a dye from among existing dyes which can satisfy all of the characteristics of water resistance, light resistance and tone. For example, a direct dye having good water resistance is not sharp in tone, while an acidic dye having sharp tone is inferior in light resistance, and a metal containing dye having good light resistance is not sharp in tone.

Thus, the present invention has been accomplished as the result of extensive investigation to find a dye suitable for the ink to be used for such purpose.

SUMMARY OF THE INVENTION

The object of the present invention is to provide a recording liquid stable on prolonged storage, exhibiting good ink fixability onto a recording medium, giving a sharp image in high density, and having light resistance and water resistance of the image.

The present invention provides a recording liquid, comprising a solution of a recording agent, wherein said recording agent has a structure having plural structural units linked together through a linking group.

Here, the structural units refer to the dye residues represented by the formulae (A), (B), (C) and (D) shown below, and the linking group to the groups represented by the following formulae (X), (Y), (Z) and

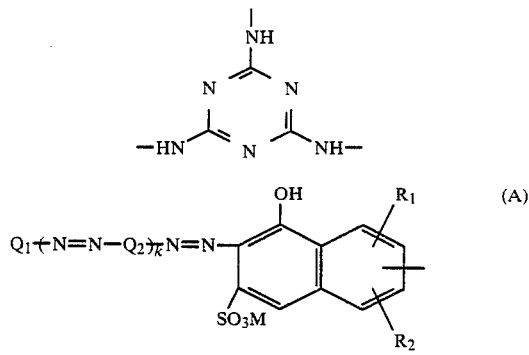

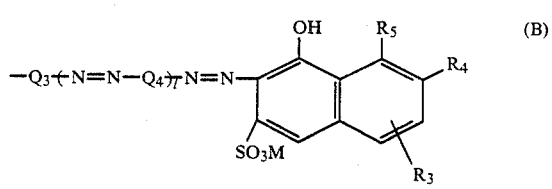

(A)

wherein $Q_1$ and $Q_2$ each represent a benzene ring or a naphthalene ring which may have a substituent, $R_1$ represents a hydrogen atom or an amino group, $R_2$ represents a hydrogen atom or a sulfonic group and k represents a numeral 0 or 1.

(B)

$Q_3$ and $Q_4$ each represent a benzene ring or a naphthalene ring which may have a substituent, $R_3$ represents a hydrogen atom or a sulfonic group, $R_4$ and $R_5$ each represent a group selected from the group consisting of a hydrogen atom, an amino group,

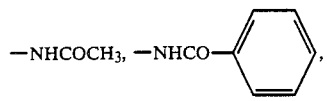

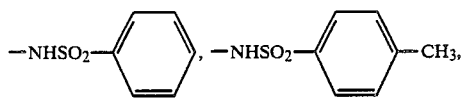

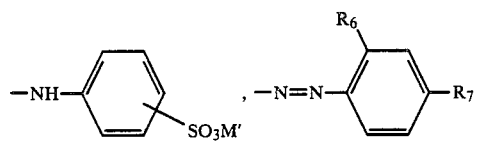

($R_6$ and $R_7$ each represent a hydrogen atom, an amino group, a monoethanol amino group, an acylamino group, an alkyl group, a sulfonic group),

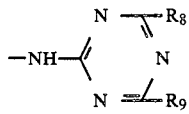

($R_8$ and $R_9$ each represent a hydroxyl group, an amino group, a monoethanolamino group or a diethanol amino group), l represents a numeral 0 or 1.

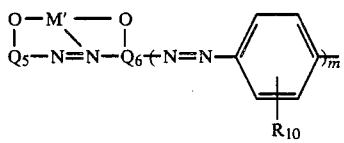

$Q_5$ and $Q_6$ each represent a benzene ring or a naphthalene ring which may have a substituent, $R_{10}$ represents a hydrogen atom or a sulfonic group, M' represents a divalent or a higher valent metal atom, m represents a numeral 0 or 1.

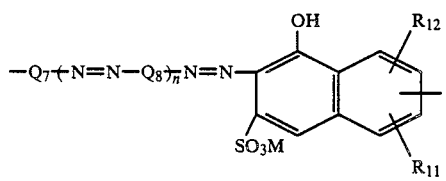

$Q_7$ and $Q_8$ represents a benzene ring or a naphthalene ring which may have a substituent, $R_{11}$ represents a hydrogen atom or a sulfonic group, $R_{12}$ a hydrogen atom or an amino group, n represents a numeral 0 or 1.

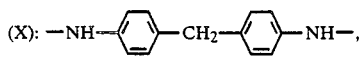

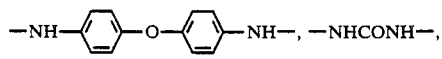

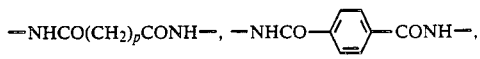

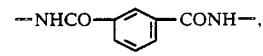

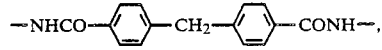

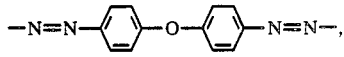

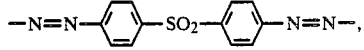

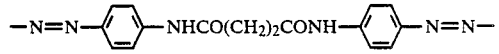

(wherein p is an integer of 2-6)

(Y): —$(CH_2)_q$—, —NHCONH—, —NHCO—, —O—, —$SO_2$—, —$NHCO(CH_2)_r CONH$—, —NH—

(wherein q and r are integers of 1-6)

(Z): —NHCONH—, —NH—, —CH=CH—, —N=N—, —$COO(CH_2)_2OCO$—

In the above formulae, a sulfonic group and a carboxylic group form salts with bases selected from alkali metals, ammonia and organic amines.

DESCRIPTION OF THE PREFERRED EMBODIMENTS

The present invention is described in more detail. The present inventors have made comprehensive studies on the dye for the recording agent component of the ink in order to accomplish the object of the present invention as mentioned above, and consequently discovered that dyes having specific structures could be obtained which are suitable for a recording agent of the ink, particularly the recording agent of the ink used in an ink jet system. By employment of the dye with such specific structure, when employed in the ink jet system, the ink has satisfactory liquid properties matching to ejection conditions, stability during prolonged storage, ink fixability onto a recording medium, sharpness of image, high density image, light resistance, water resistance of image and other requisite performances.

The dyes to be used in the present invention which primarily characterize the present invention may include:

(I) those having two structural units linked through one linking group;

(II) those having three structural units linked through two linking groups;

(III) those having three structural units linked through one linking group;

as shown below, and from the effect of the present invention, those of (III) are the most preferable and those of (II) are secondly preferable.

Of the dyes represented by (I), those in which one of the structural units is represented by formula (A) or (B) and the other by (C) are more preferable, because light resistance and tone are also improved in addition to improvement of water resistance which is the primary object.

Further, as the dye for the ink to be used in a device in which liquid droplets are generated by thermal energy, those in which all the benzene rings or naphthalene rings have one or more sulfonic groups per each ring in the molecular structures of (I)–(III) are preferred with respect to thermal stability and solubility.

Specific examples are shown below.

(Ia) Dyes having two structural units (Formula A) through one linking group (X):

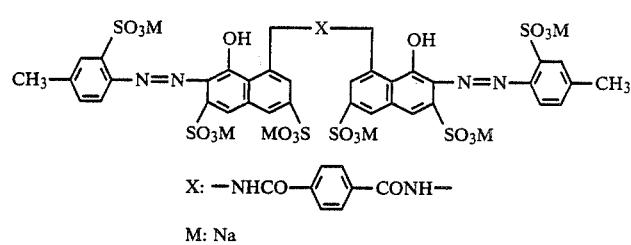

(1-1)

X: —NHCO—⟨⟩—CONH—

M: Na

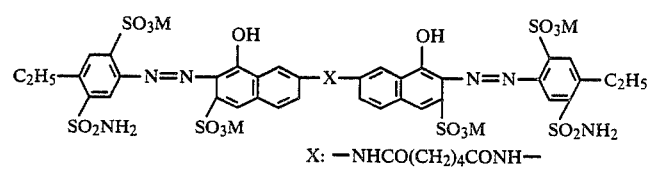

(1-2)

X: —NHCO(CH$_2$)$_4$CONH—

M: Li

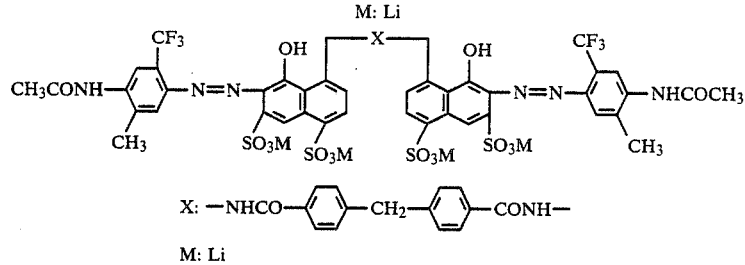

(1-3)

X: —NHCO—⟨⟩—CH$_2$—⟨⟩—CONH—

M: Li

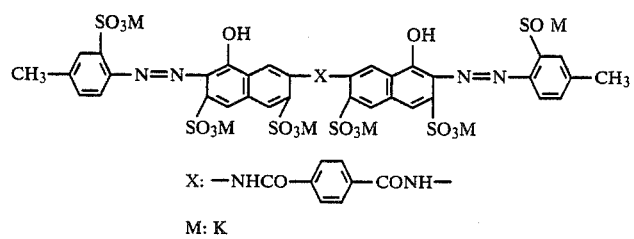

(1-4)

X: —NHCO—⟨⟩—CONH—

M: K

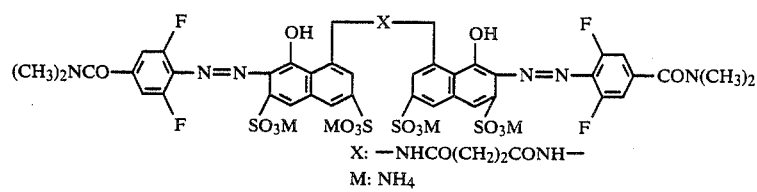

(1-5)

X: —NHCO(CH$_2$)$_2$CONH—

M: NH$_4$

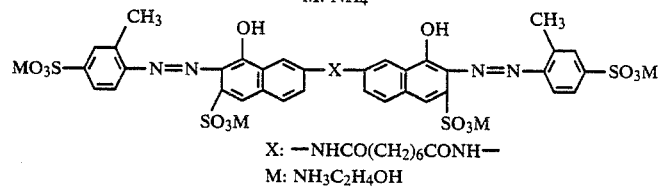

(1-6)

X: —NHCO(CH$_2$)$_6$CONH—

M: NH$_3$C$_2$H$_4$OH

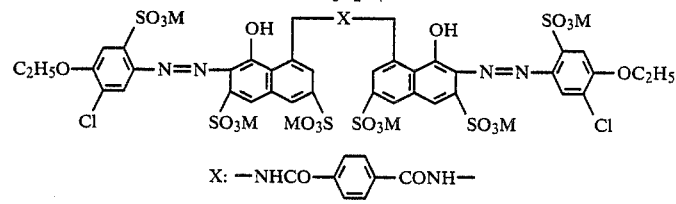

(1-7)

X: —NHCO—⟨⟩—CONH—

M: Na

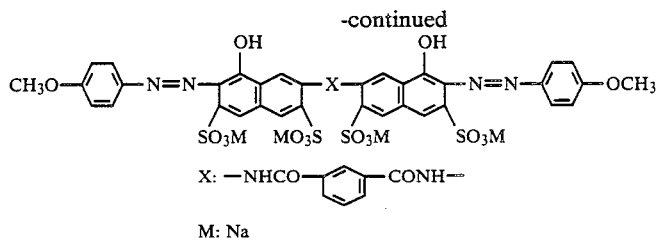
(1-8)
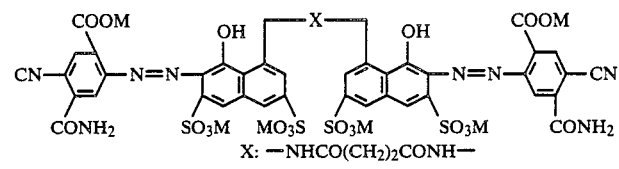
(1-9)
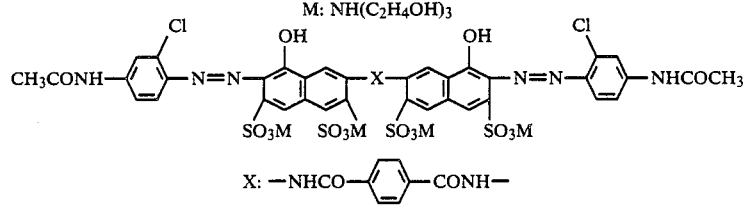
(1-10)
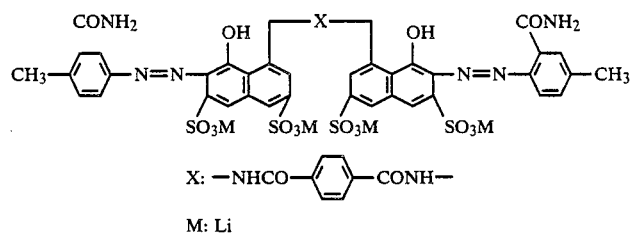
(1-11)
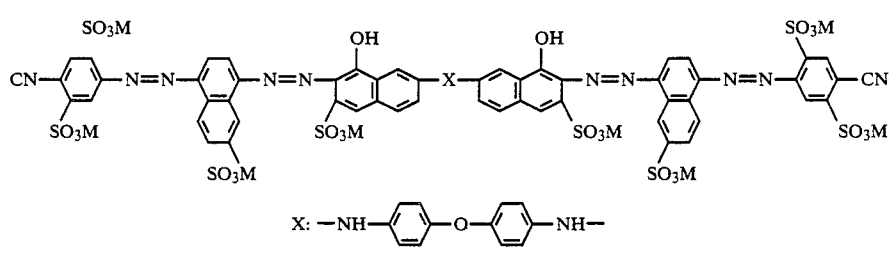
(1-12)
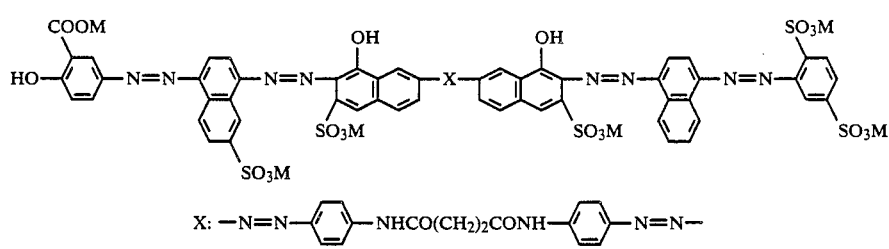
(1-13)
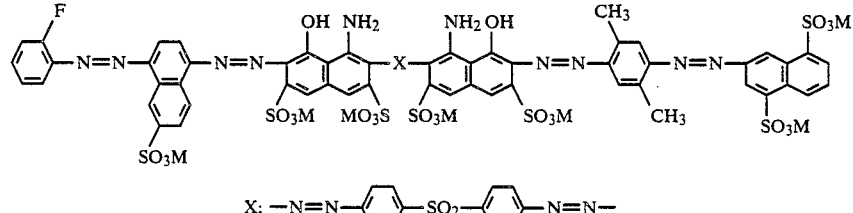
(1-14)

-continued
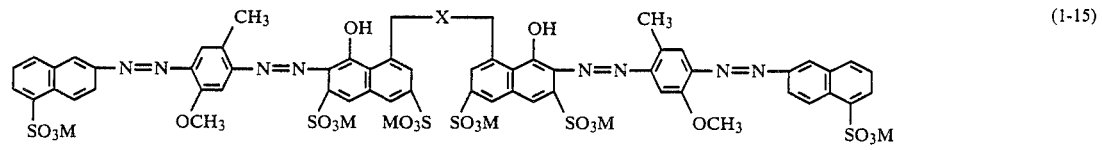
(1-15)
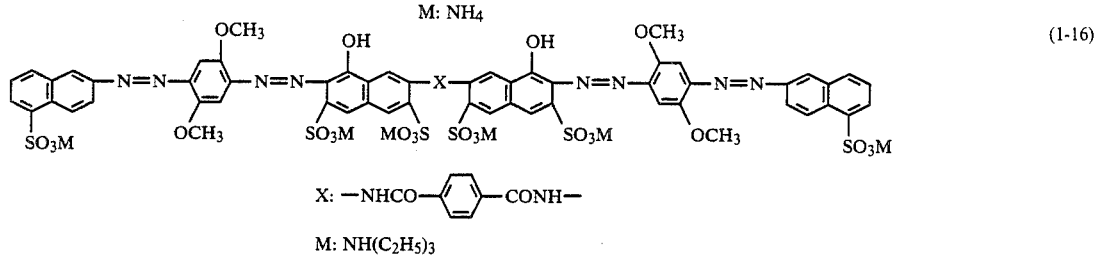
(1-16)
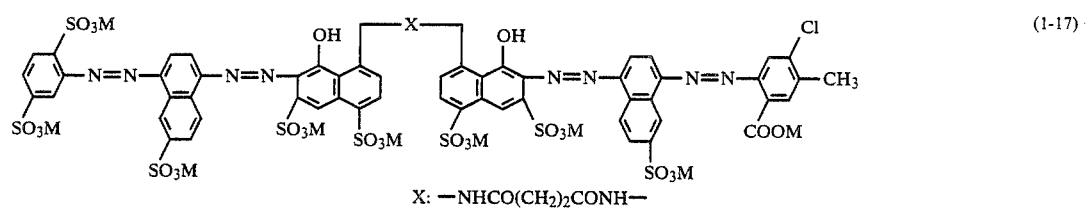
(1-17)
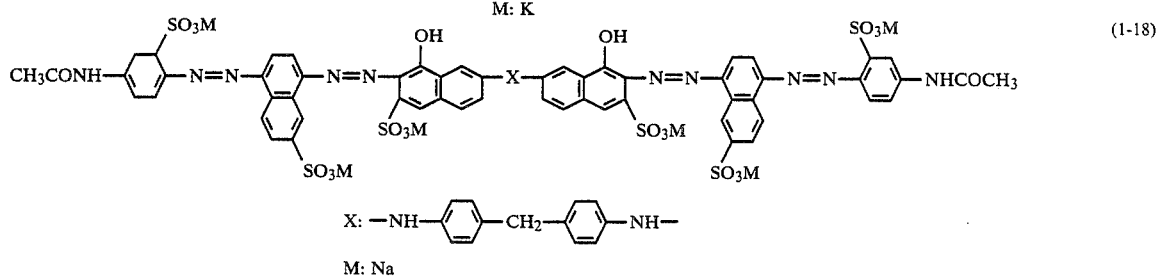
(1-18)
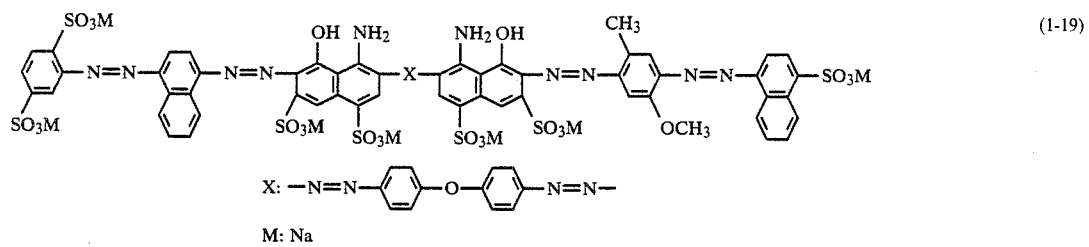
(1-19)
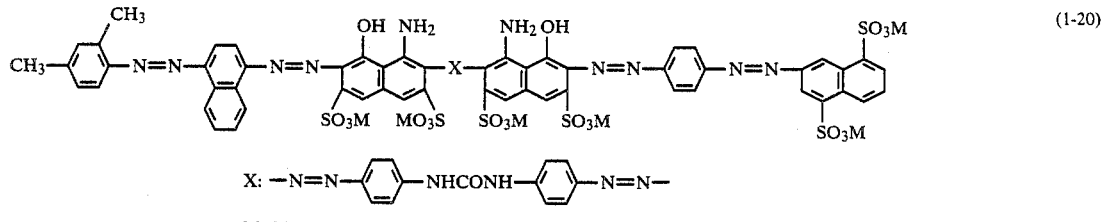
(1-20)
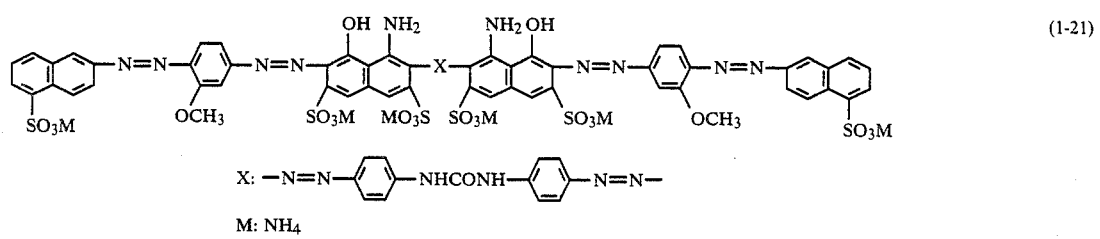
(1-21)

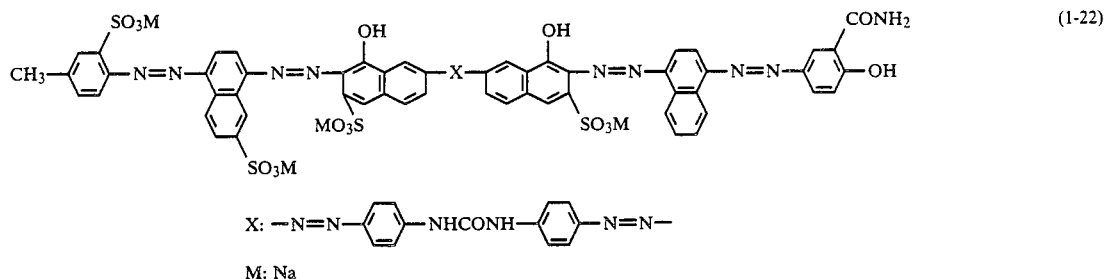
(1-22)
X: —N=N—⟨⟩—NHCONH—⟨⟩—N=N—
M: Na
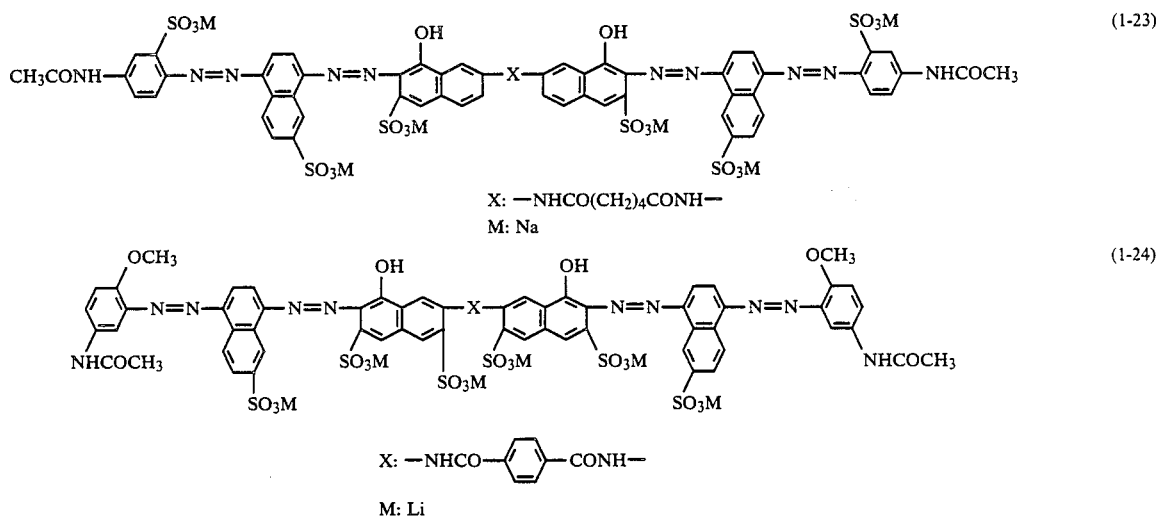
(1-23)
X: —NHCO(CH₂)₄CONH—
M: Na
(1-24)
X: —NHCO—⟨⟩—CONH—
M: Li
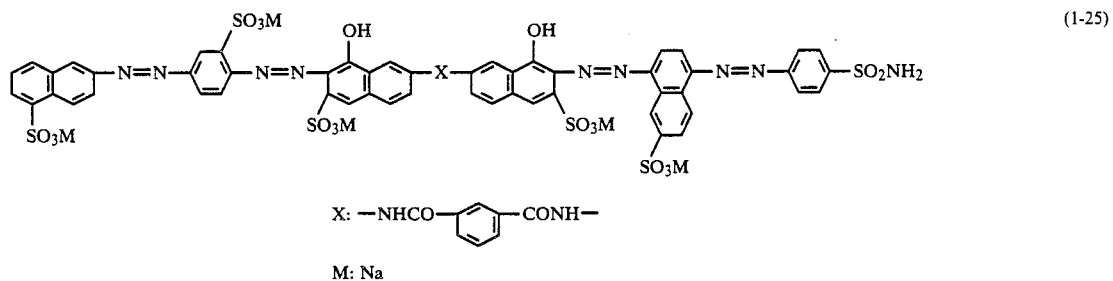
(1-25)
X: —NHCO—⟨⟩—CONH—
M: Na
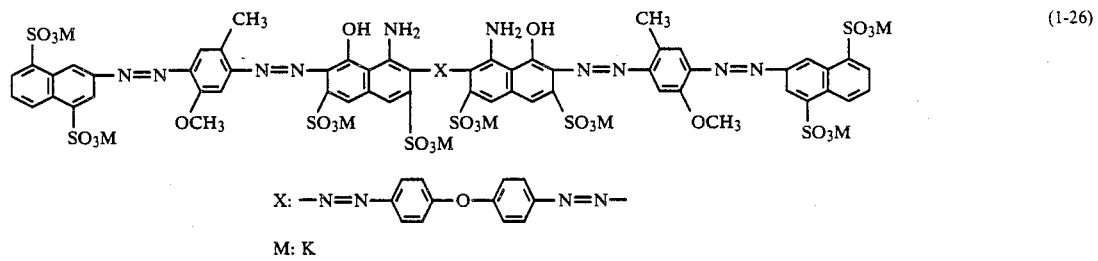
(1-26)
X: —N=N—⟨⟩—O—⟨⟩—N=N—
M: K
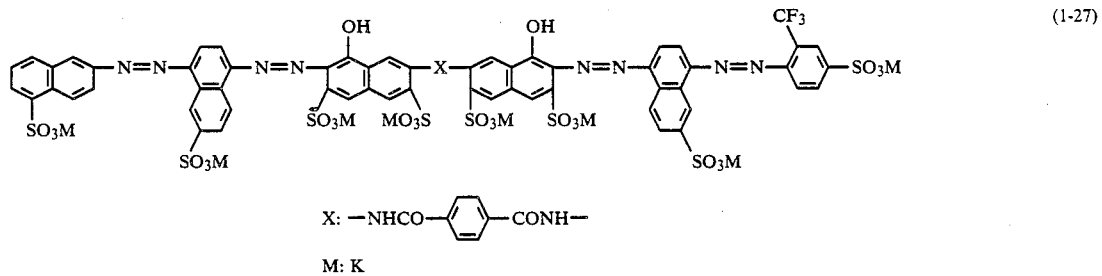
(1-27)
X: —NHCO—⟨⟩—CONH—
M: K -continued
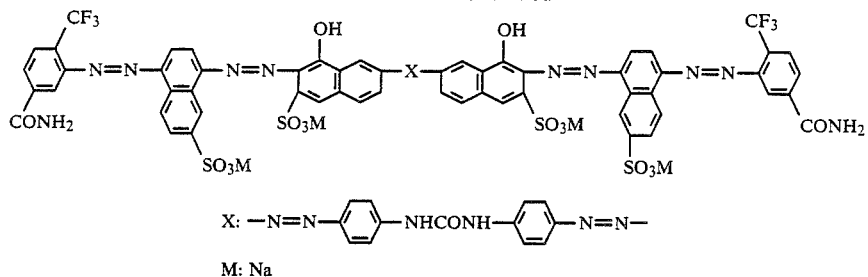
(1-28)
X: —N=N—⟨⟩—NHCONH—⟨⟩—N=N—
M: Na
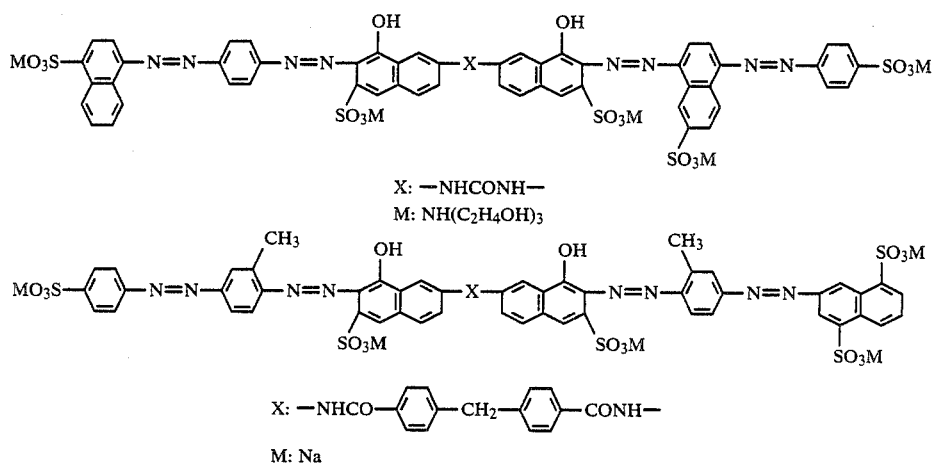
(1-29)
X: —NHCONH—
M: NH(C₂H₄OH)₃
(1-30)
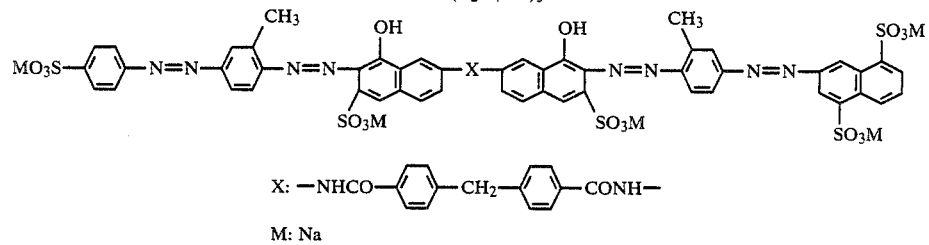
X: —NHCO—⟨⟩—CH₂—⟨⟩—CONH—
M: Na
(1-31)
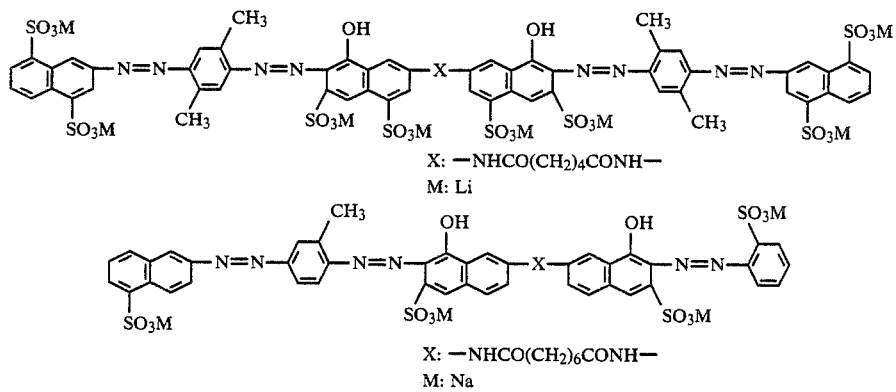
X: —NHCO(CH₂)₄CONH—
M: Li
(1-32)
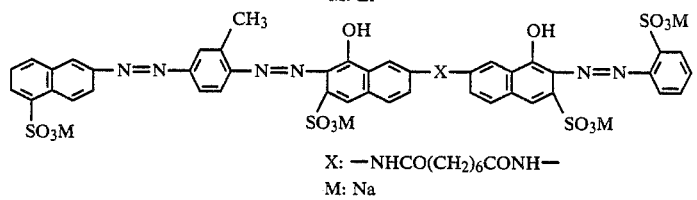
X: —NHCO(CH₂)₆CONH—
M: Na
(1-33)
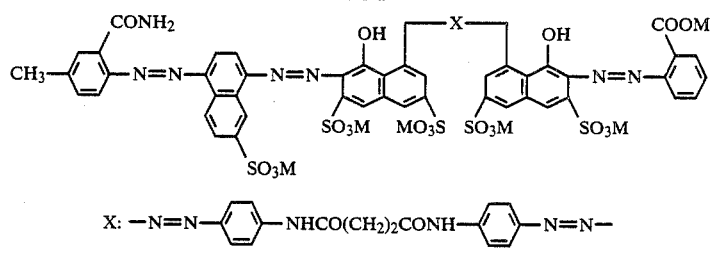
X: —N=N—⟨⟩—NHCO(CH₂)₂CONH—⟨⟩—N=N—
M: Na
(1-34)
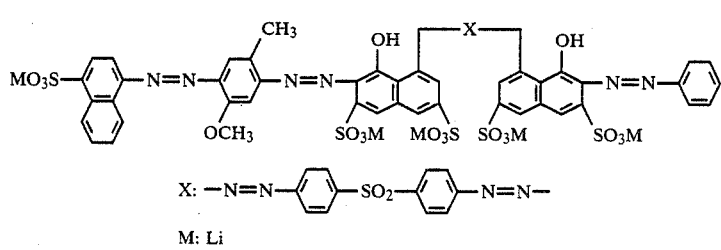
X: —N=N—⟨⟩—SO₂—⟨⟩—N=N—
M: Li -continued
(Ib) Dyes having two structural units (Formula B) through one linking group (Y): (1-35)
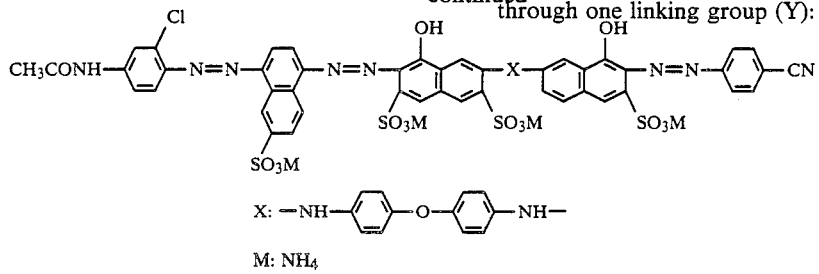
X: —NH—⟨⟩—O—⟨⟩—NH—
M: NH$_4$ (2-1) 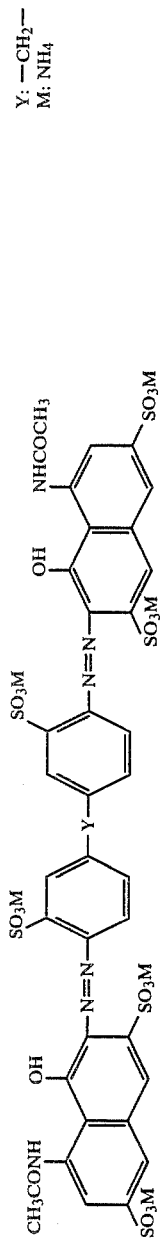
Y: —CH₂—
M: NH₄
(2-2) 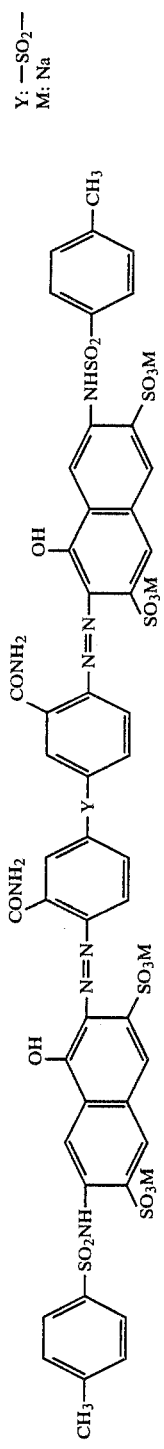
Y: —SO₂—
M: Na
(2-3) 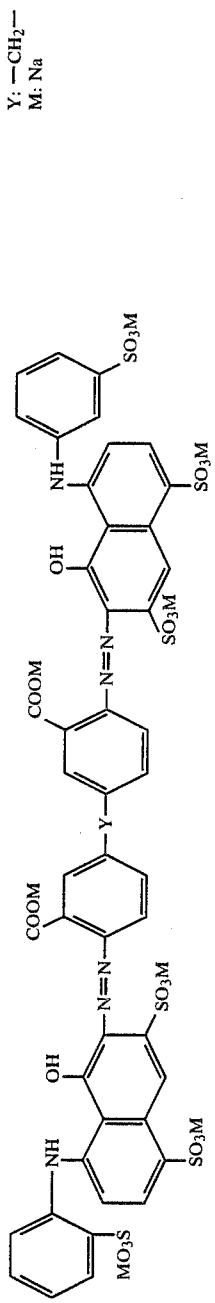
Y: —CH₂—
M: Na
(2-4) 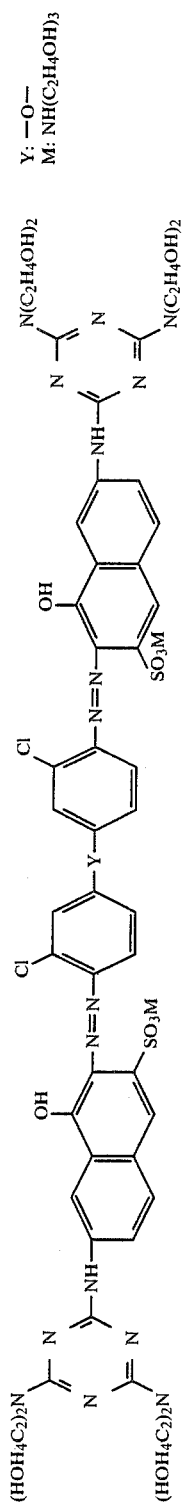
Y: —O—
M: NH(C₂H₄OH)₃
(2-5) 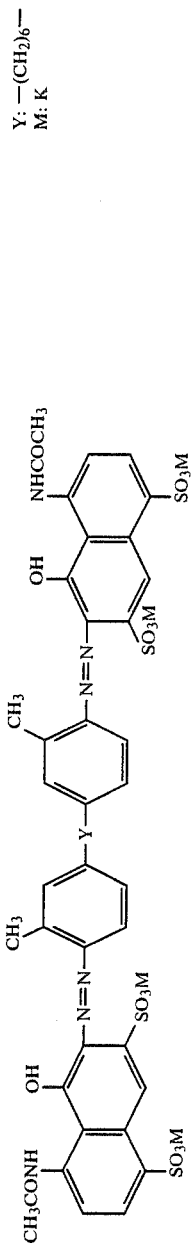
Y: —(CH₂)₆—
M: K

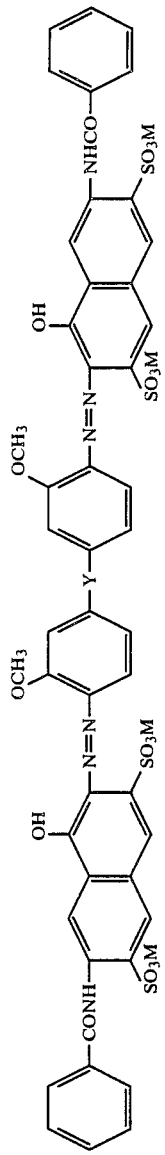
(2-6)
Y: —NHCONH—
M: Li
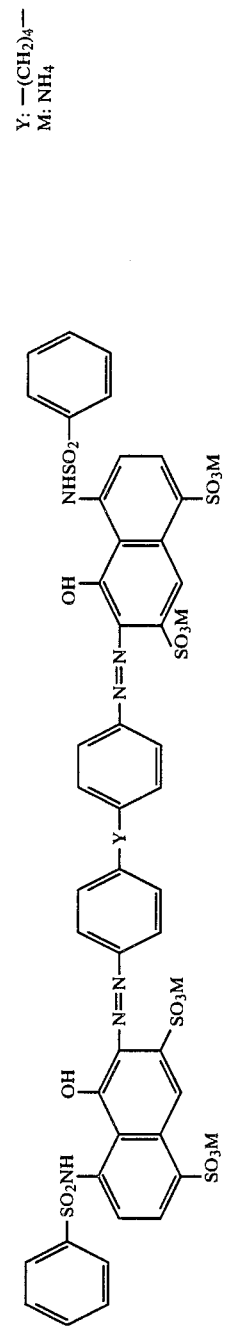
(2-7)
Y: —(CH$_2$)$_4$—
M: NH$_4$
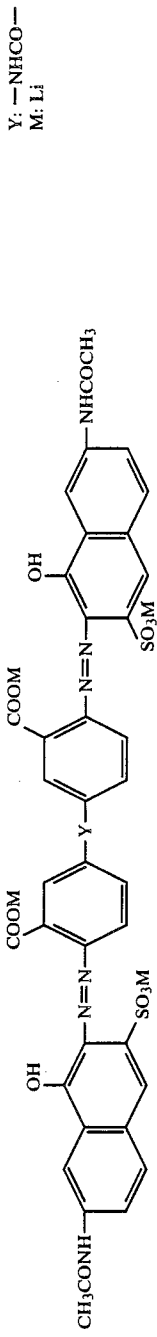
(2-8)
Y: —NHCO—
M: Li
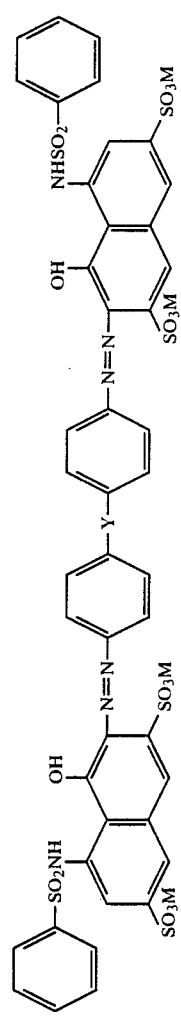
(2-9)
Y: —NHCO(CH$_2$)$_2$CONH—
M: Li
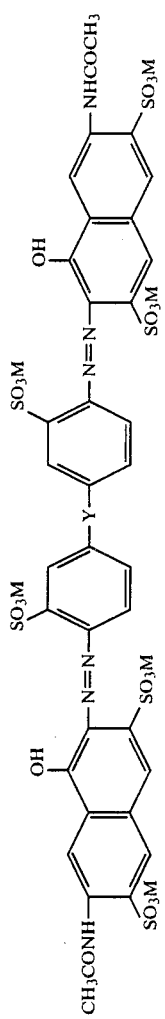
(2-10)
Y: —CH$_2$—
M: Na 21   4,804,411   22
(2-11) Y: —NHCONH—  Ma: Na
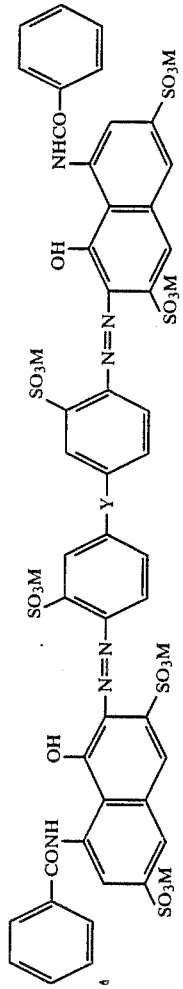
(2-12) Y: —(CH$_2$)$_6$—  M: Na
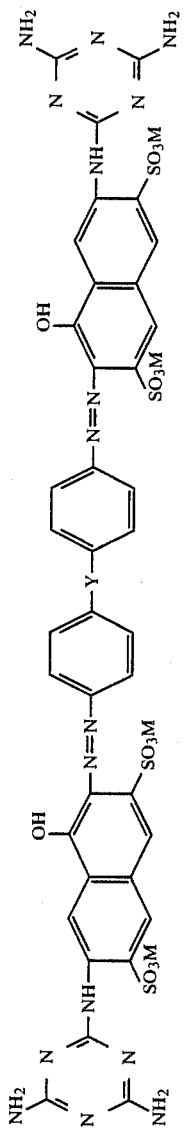
(2-13) Y: —NHCONH—  M: Li
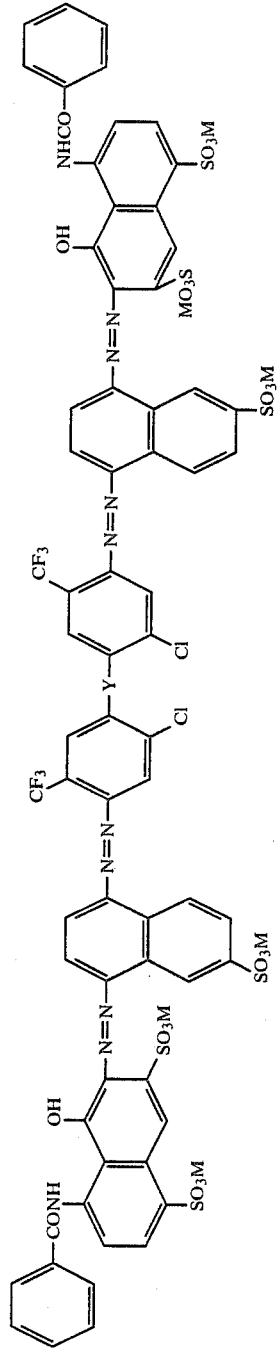
(2-14) Y: —SO$_2$—  M: NH(C$_2$H$_4$OH)$_3$
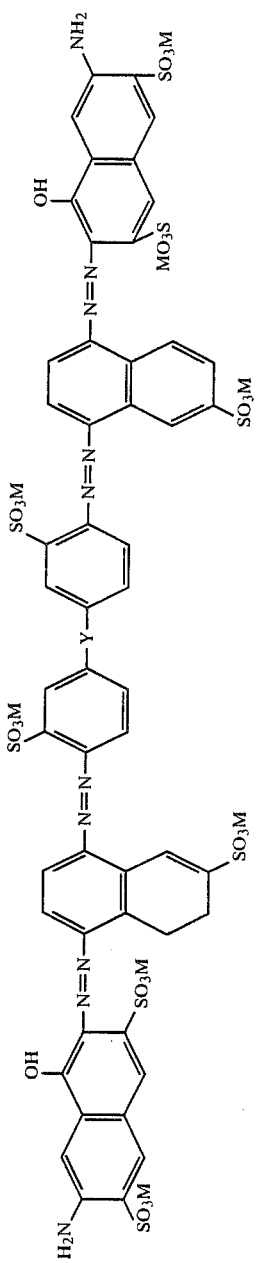

-continued
(2-15) 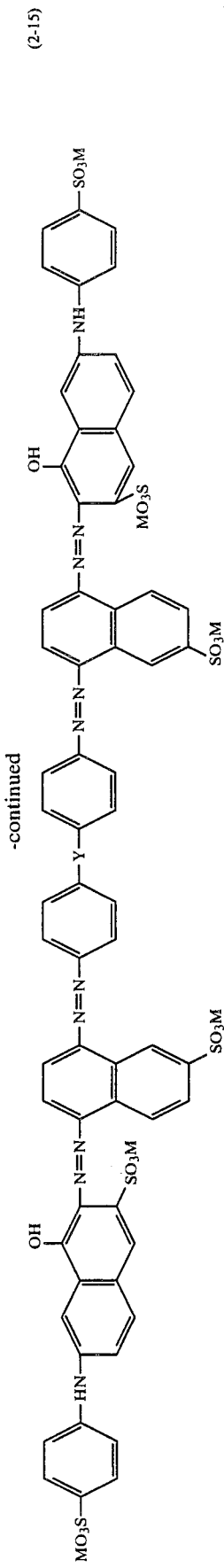
(2-16) 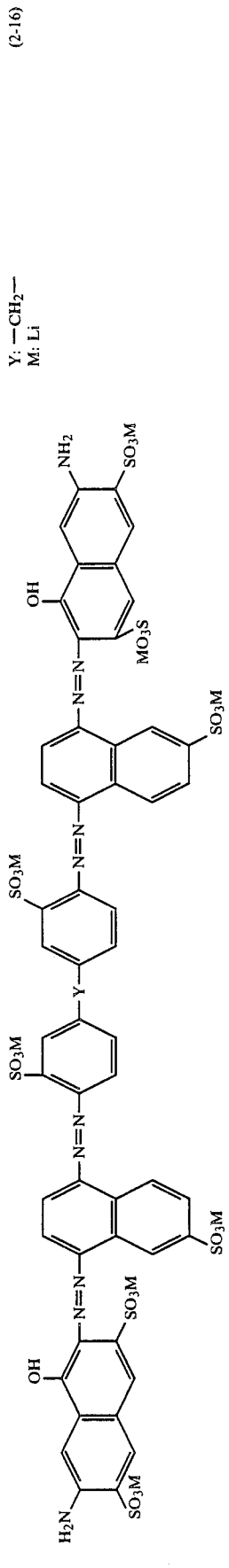
Y: —CONH—
M: K
(2-17) 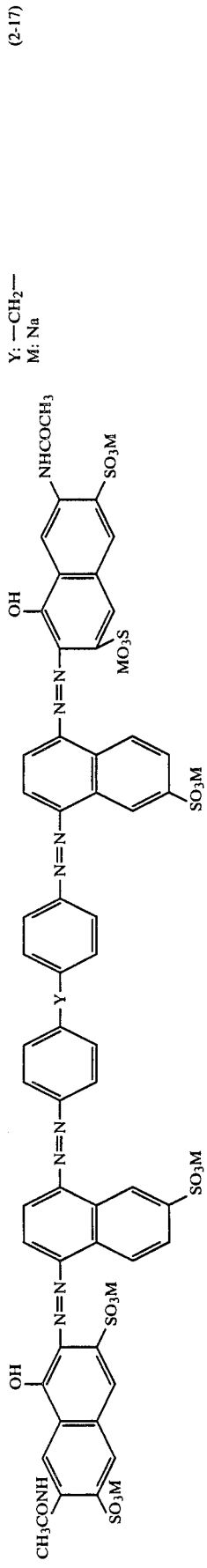
Y: —CH$_2$—
M: Li
Y: —CH$_2$—
M: Na
(2-18) 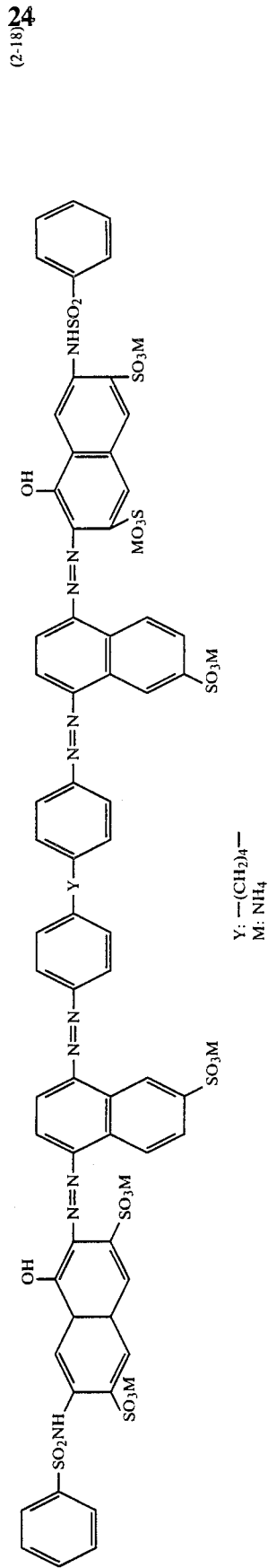
Y: —(CH$_2$)$_4$—
M: NH$_4$

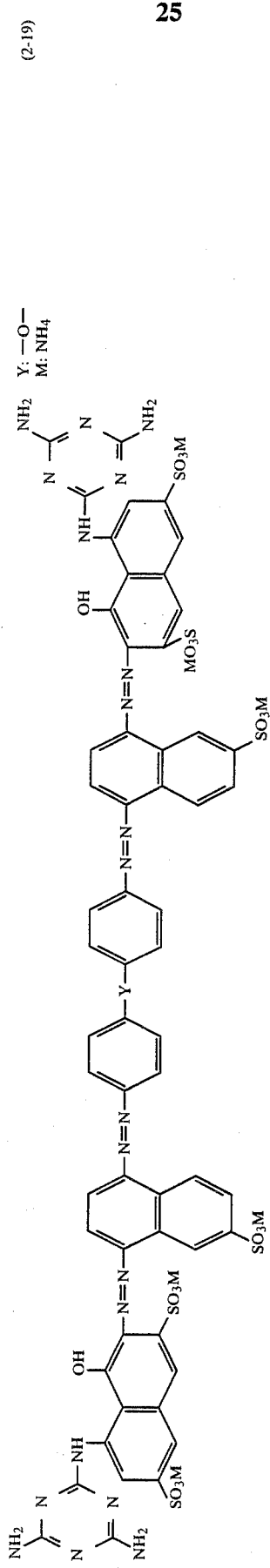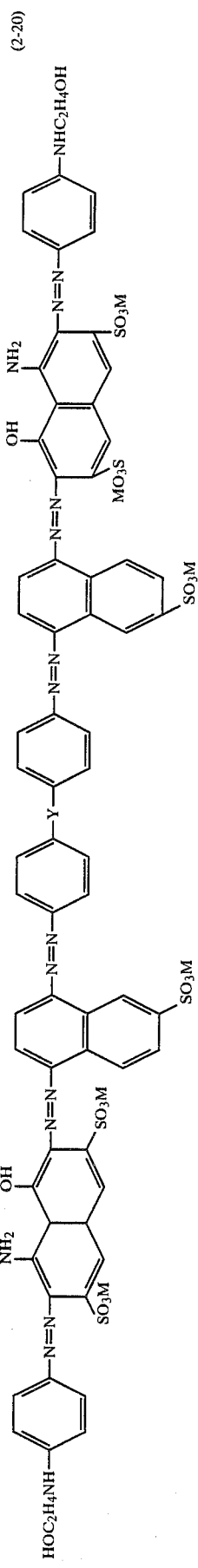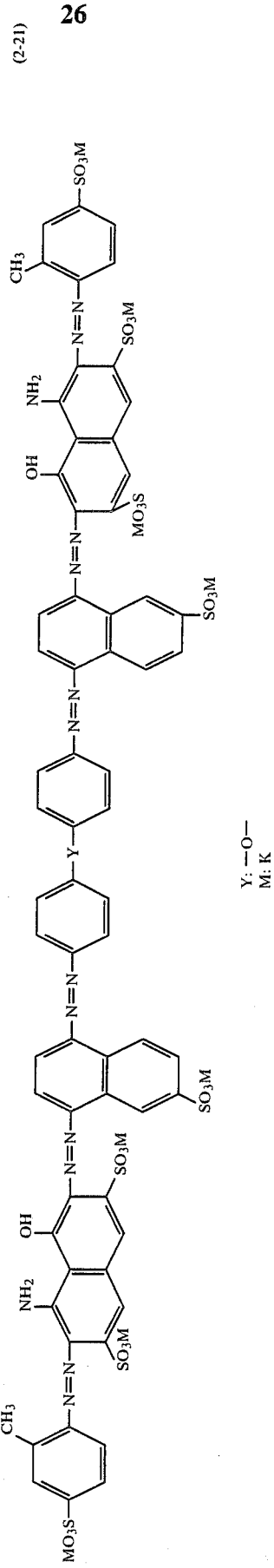

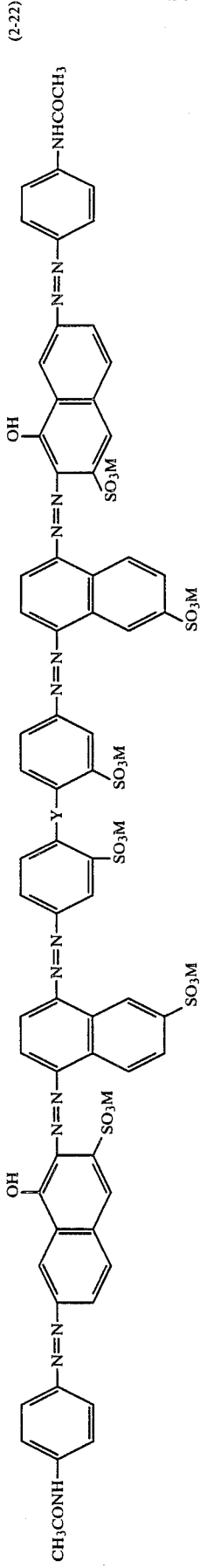
(2-22)
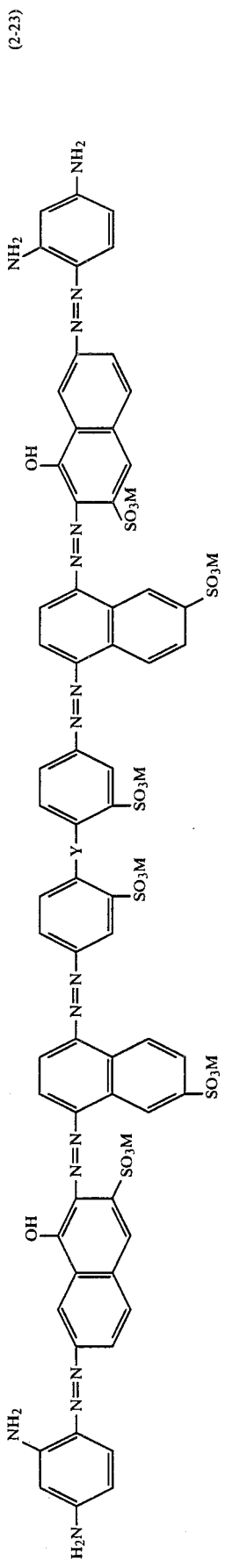
(2-23)
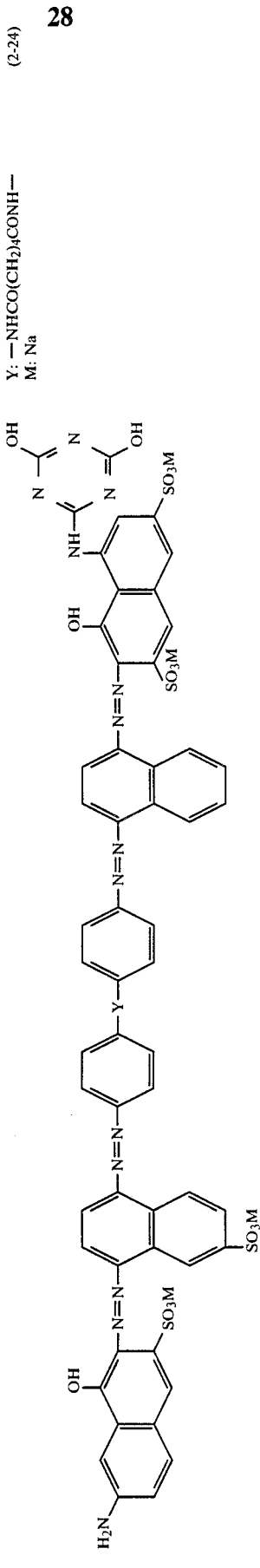
(2-24)

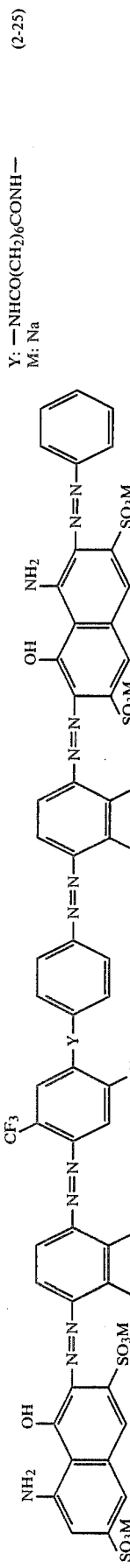
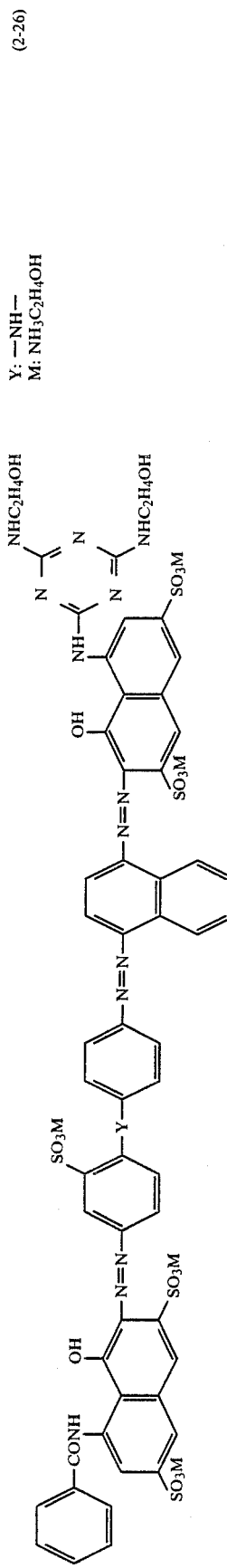

(Ic) Dyes having two structural units (Formula C) through one linking group (Z):
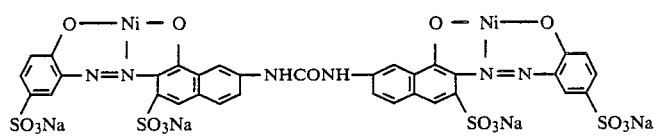 (3-1)
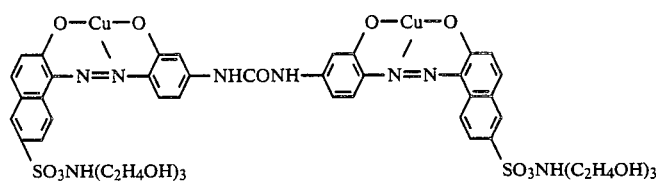 (3-2)
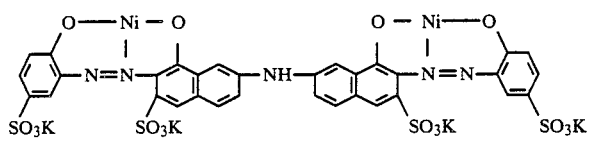 (3-3)
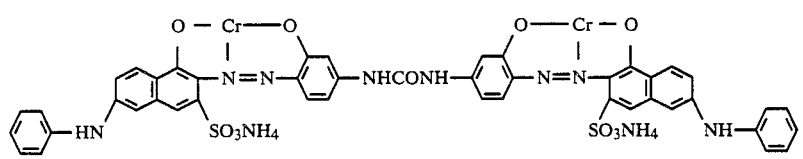 (3-4)
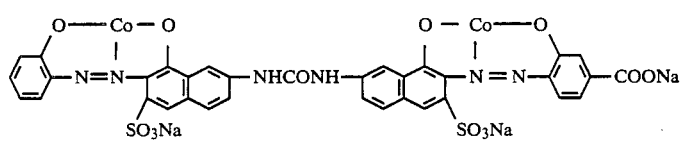 (3-5)
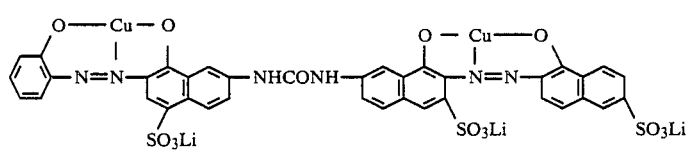 (3-6)
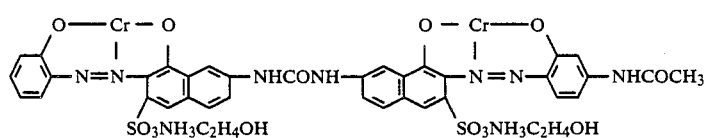 (3-7)
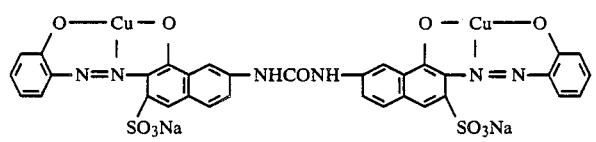 (3-8)
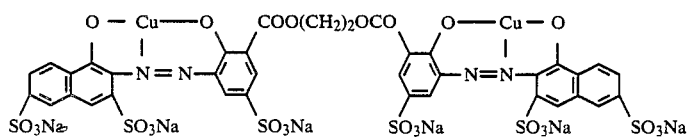 (3-9)
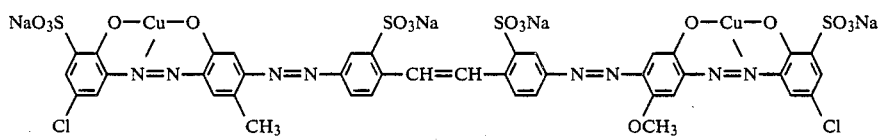 (3-10)

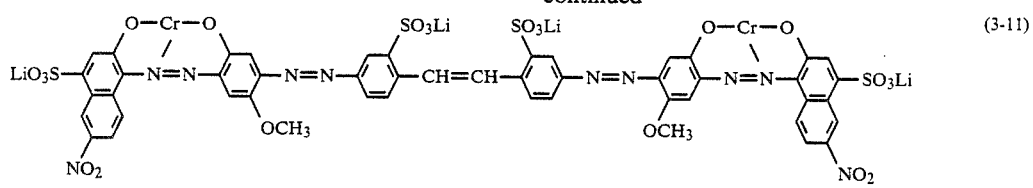 (3-11)
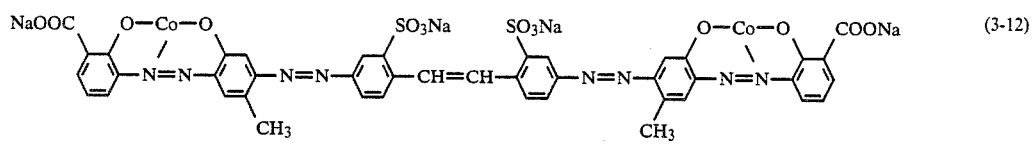 (3-12)
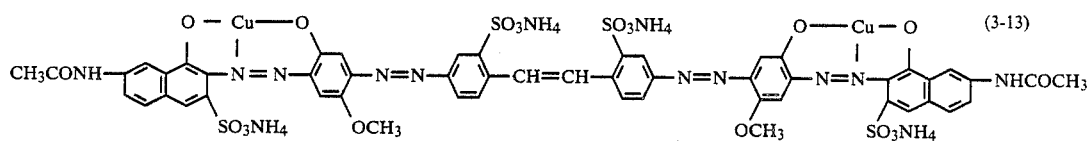 (3-13)
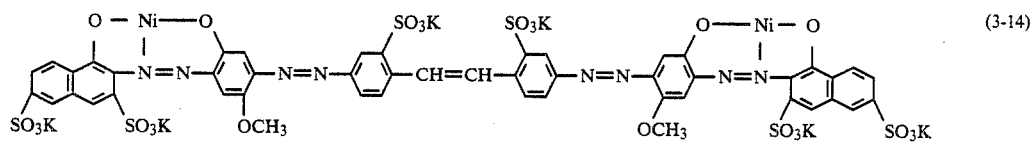 (3-14)
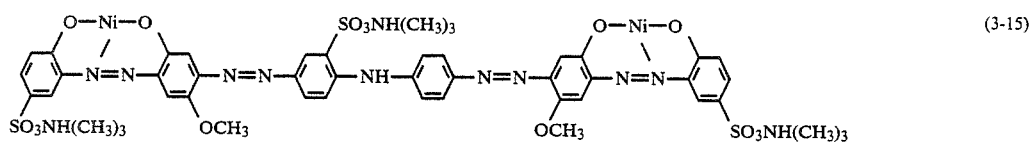 (3-15)
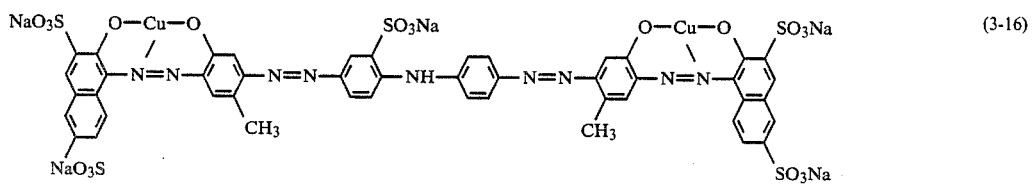 (3-16)
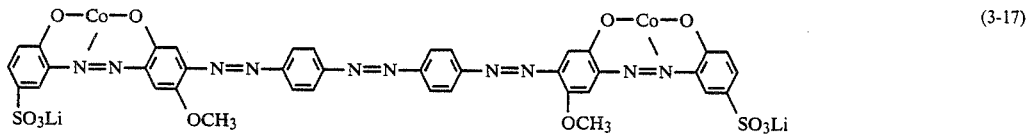 (3-17)
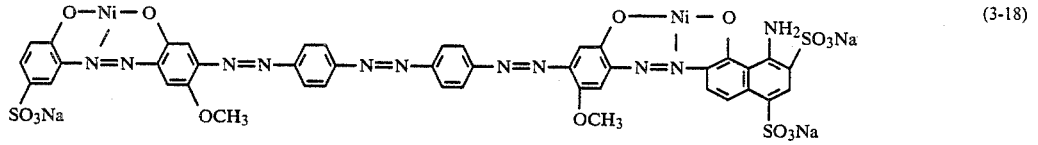 (3-18)
(Id) Dyes having two structural units (Formula A or B and Formula C) through one linking group:
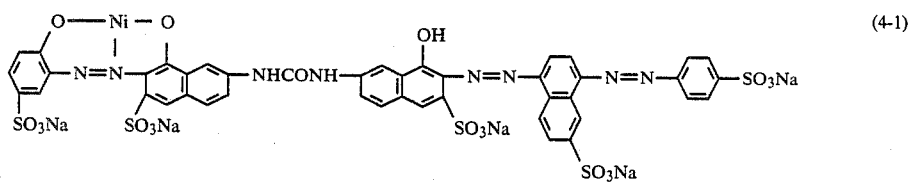 (4-1)

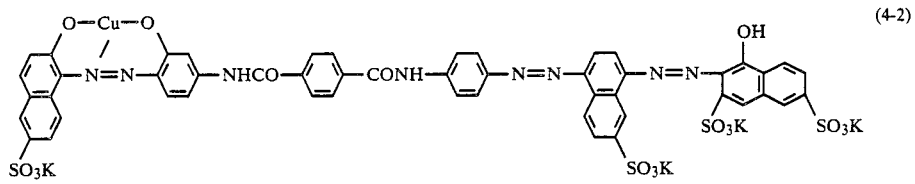
(4-2)
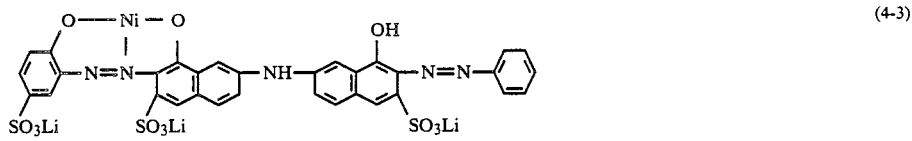
(4-3)
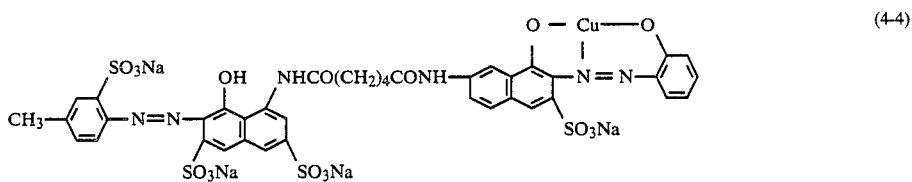
(4-4)
(II) Dyes having three structural units (Formula A or B and Formula D) through two linking groups:
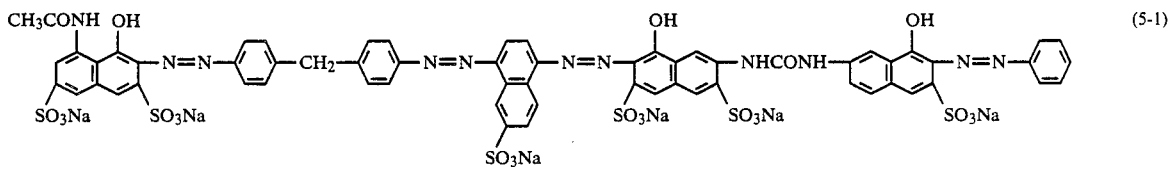
(5-1)
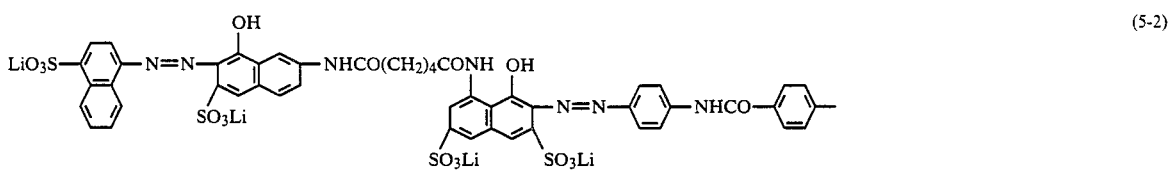
(5-2)
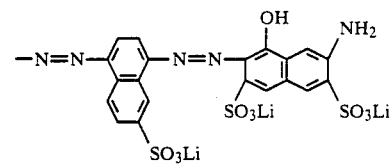
(III) Dyes having three structural units (Formula A, B or C) through one linking group:
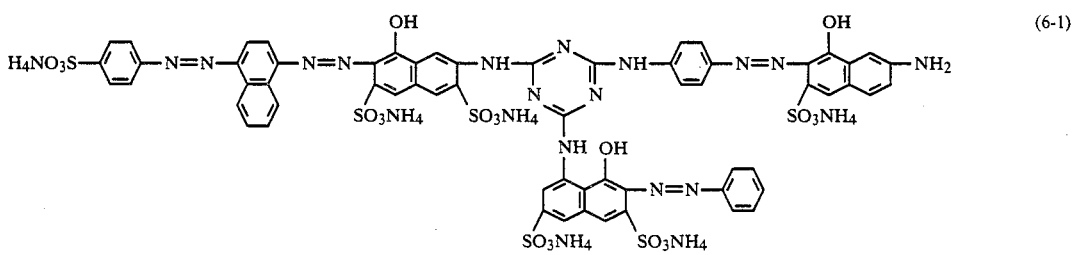
(6-1)

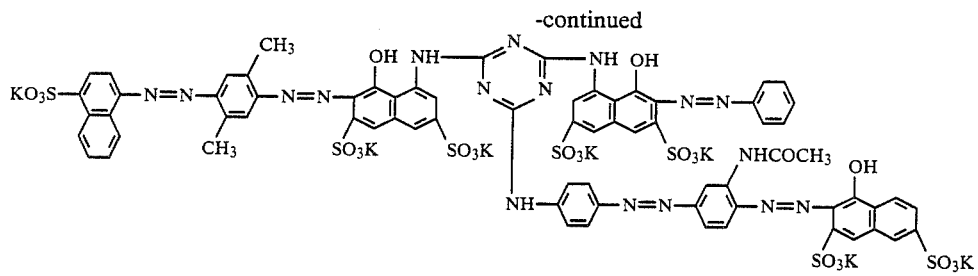
(6-2)

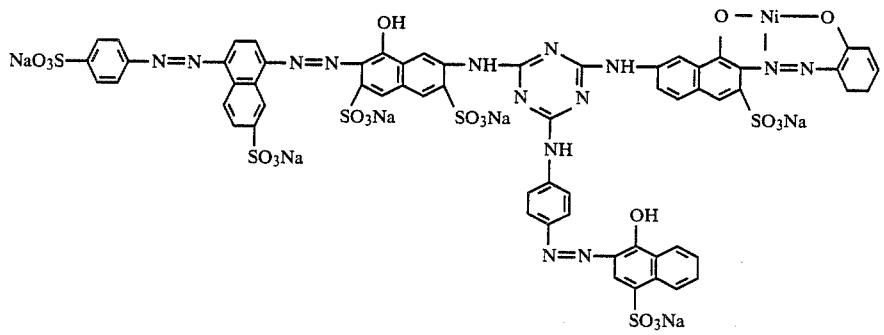
(6-3)

By using specific dyes as described above as the recording agent of ink, there can be obtained an ink having physical properties such as viscosity, surface tension, etc., within appropriate ranges, which can give recorded images of sufficiently high optical density without causing clogging of fine discharging orifices, high in thermal density to enable recording on various members without limitation in kind of the recording medium without causing change in physical properties or precipitation of solids during storage, high fixing speed and also capable of giving images excellent in water resistance, light resistance, abrasion resistance and resolving power.

The content of the dye as described above may be decided depending on the kind of the liquid medium component, the characteristics required for the ink, etc., but it is generally made 0.1 to 20 percent by weight preferably 0.5 to 15 percent by weight, more preferably 1 to 10 percent by weight based on the total weight of the ink. The dye may be of course used either singly or as a combination of two or more kinds, or alternatively in addition to the dye as the essential component, a dye selected from other various dyes such as other direct dyes and acidic dyes may be also used in combination.

A suitable solvent to be used in the ink of the present invention may be water or a solvent mixture of water with a water-soluble organic solvent, particularly preferably a solvent mixture of water with a water-soluble organic solvent, containing a polyhydric alcohol capable of preventing drying of ink as the water-soluble organic solvent. Water used is preferably deionized water instead of water in general containing various ions. Examples of the water-soluble organic solvents to be used as a mixture with water may include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols of which alkylene group contains 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol methyl (or ethyl) ether, diethylene glycol methyl (or ethyl) ether, triethylene glycol monomethyl (or ethyl) ether, etc.; N-methyl-2-pyrrolidone, 1,3-dimethyl-2-imidazolidinone, and so on. Among these water-soluble organic solvents, polyhydric alcohols such as diethylene glycol, lower alkyl ethers of polyhydric alcohols such as triethylene glycol monomethyl (or ethyl) ether, etc., are preferred.

The content of the above water-soluble organic solvent in the ink may be 5 to 95% by weight, preferably 10 to 80% by weight, more preferably 20 to 50% by weight based on the total weight of the ink.

The water can be contained over a broad range depending on the kind of the above solvent component, its composition or the desired characteristics of ink, but the content is generally within the range from 10 to 90%, preferably from 10 to 70%, more preferably from 20 to 70%.

The ink of the present invention formulated from such components is excellent and well balanced per se in recording characteristics (response to signals, stability of droplet formation, ejection stability, continuous recording performance for a long time, ejection stability after intermission of recording for a long time), storage stability, fixability onto recording medium, or light resistance, weathering resistance, water resistance, etc., of the recorded image. And, for further improvement of such characteristics, any of various additives known in the prior art may be further added.

For example, there may be employed viscosity controllers such as polyvinyl alcohol, cellulose, water-soluble resins, etc.; surface tension controllers such as various cationic, anionic or nonionic surfactants, diethanolamine, triethanolamine, etc.; pH controllers with buffer solutions, antifungal agents, etc.

Also, for formulation of an ink to be used for the ink jet system of the type which charges the ink, a specific resistance controller of inorganic salts such as lithium chloride, ammonium chloride, sodium chloride, etc., may be added.

In the application to a type of an ink jet system ejecting ink by action of thermal energy, thermal physical properties (e.g. specific heat, coefficient of thermal expansion, thermal conductivity, etc.) may be sometimes controlled.

The ink of the present invention as described above is useful as the ink for recording with various writing implements, recording instruments, etc., particularly as the ink for ink jet recording.

In the case of the ink jet system as a preferable example, the ink jet system may be of any type provided that the ink can be effectively released from the nozzle and the ink can be applied onto the recording medium which is the object against which the ink is projected. Typical examples of those systems are described in, for example, IEEE Trans Actions on Industry Applications Vol. JA-13, No. 1 (February, March, 1977), Nikkei Electronics Apr. 19, 1976, Jan. 29, 1973 and May 6, 1974. The systems described in these references are suitable for using the ink of the present invention. Among the systems, first there is the electrostatic attracting system. According to this system, a strong electrical field is applied between a nozzle and an accelerating electrode placed several millimeters ahead of the nozzle, thereby drawing out successively particulate ink from the nozzle, and recording is effected by giving information signals to the deflecting electrode while the ink flies between the deflecting electrodes. Alternatively, without deflection of ink particles, ink particles are jetted corresponding to the information signals. Either system may be effective for the ink of the present invention.

As the second system, high pressure is applied on the ink by a small pump to vibrate mechanically the nozzle with a quartz oscillator, etc., thereby jetting compulsorily the minute ink particles, and the ink particles jetted are electrically charged corresponding to information signals at the time of jetting. The charged ink particles are deflected corresponding to the quantity of the charge while passing between the deflecting electrode plates. As another type of this system, there is also one called the microdot ink jet system, and according this system, ink pressure and vibrating conditions are maintained within certain appropriate values to generate two kinds of large and small ink droplets from the nozzle tip, of which only the small size droplets are utilized for recording. The specific feature of this system resides in that minute droplets can be obtained even with a thick nozzle apperture as used in the prior art.

As the third system, there is a piezoelectric element system, and according to this system, as the pressure means to be applied on the ink, piezoelectric element is utilized in place of the mechanical means such as a pump in other systems. This is a system in which electrical signals are given to the piezoelectric element to create mechanical displacements, whereby pressure is applied on the ink to jet out the ink from the nozzle.

Further, an ink jet system, which ejects ink from the nozzle according to the method described in Japanese Patent Laid-open Publication No. 51837/1979 by the acting force through the abrupt volume change of the ink subjected to the action of heat energy, can be effectively used.

The ink of the present invention, as described above, employing a dye with a specific structure as the recording agent, has excellent recording characteristics such as stability during prolonged storage, ejection stability, ejection response, etc., as a general recording ink as a matter of course, particularly as an ink to be used for an ink jet system, and also exhibits excellent ink fixability when applied onto a recording medium, and can give recorded images particularly excellent in light resistance, water resistance, sharpness, resolution, etc.

The present invention is described below in more detail by referring to Examples. Parts or % in these Examples are based on weight unless otherwise particularly noted.

EXAMPLE 1

| Dye of specific Example (1-1) | 3 parts |
| Diethylene glycol | 30 parts |
| N—methyl-2-pyrrolidone | 15 parts |
| Water | 52 parts |

The above composition was thoroughly mixed and dissolved in a vessel, filtered under pressurization through a Teflon (trademark) filter with a pore size of 1 $\mu$m and degassed by a vacuum pump to provide an ink of the present invention. By using the ink obtained, by means of a recording device having an on-demand type recording head (ejection orifice diameter: 50 $\mu$m, piezovibrator driving voltage: 60 V, frequency: 4 KHz) which ejects the ink by a piezovibrator, the items (T1)-(T5) shown below were examined to obtain good results in all the items.

(T1) Long term storability of ink; when the ink was hermetically sealed in a glass vessel and stored at $-30°$ C. and 60° C. for 6 months, no precipitation of insolubles was recognized and there was no change in properties or tone of the liquid.

(T2) Ejection stability; when continuous ejection was conducted for 24 hours at room temperature, 5° C., and 40° C., respectively, recording of high quality could be performed from the beginning to the end in either condition.

(T3) Ejection response; when intermittent ejection for every two seconds and after left to stand for two months were examined, no clogging was caused at the orifice tip end in either case and the uniform and stable recording could be effected.

(T4) Quality of the recorded image; the recorded image was high in density and was sharp. The decrease in density after exposition to light in a room for three months was 1% or less, and after the recorded image was dipped in water for one hour, feathering of the image was extremely little.

(T5) Fixability to various recording media; printing was effected on the recording media shown in the following Table, and 15 seconds after the printing the printed portion was smeared with a finger, and presence or absence of image aberration or feathering was judged. In either case, image aberration, feathering, etc. are not observed, thus exhibiting excellent fixability.

| Name of recording medium (trade name) | Classification | Manufacturer |
| --- | --- | --- |
| Ginwa | Wood free paper | Sanyo Kokusaku Pulp K.K. |
| Seven Star | Wood free paper | Hokuetsu Seishi K.K. |
| Hakubotan | Medium quality paper | Honshu Seishi K.K. |
| Toyo Roshi No. 4 | Nonsize paper | Toyo Roshi K.K. |

EXAMPLE 2

Of the dyes enumerated in specific examples, those of the following numbers were used to carry out the same experiments as in Example 1. Good results were obtained in either case similarly as in Example 1. (1-5), (1-9) (1-14), (1-20), (1-28), (1-35), (2-4), (2-13), (2-21), (2-25), (3-2), (3-7), (3-17), (4-2), (5-1), (6-2).

EXAMPLE 3

Of the dyes enumerated in specific examples, those of the following numbers were used and the inks with the respective compositions were prepared and tested similarly as in Example 1. In either case, good results were obtained similarly as in Example 1.

| | |
|---|---|
| Dye of specific example (1-11) | 3 parts |
| Ethylene glycol | 30 parts |
| Water | 67 parts |
| Dye of specific example (1-15) | 4 parts |
| Polyethylene glycol (molecular weight 300) | 20 parts |
| N—methyl-2-pyrrolidone | 10 parts |
| Water | 66 parts |
| Dye of specific example (1-32) | 3 parts |
| Diethylene glycol | 25 parts |
| Water | 71 parts |
| Dye of specific example (2-11) | 2 parts |
| Triethylene glycol | 30 parts |
| Water | 68 parts |
| Dye of specific example (2-17) | 4 parts |
| Glycerine | 20 parts |
| Water | 76 parts |
| Dye of specific example (3-4) | 3 parts |
| Diethylene glycol | 30 parts |
| Water | 67 parts |
| Dye of specific example (4-4) | 3 parts |
| Glycerine | 25 parts |
| Water | 72 parts |
| Dye of specific example (6-1) | 4 parts |
| Tetraethylene glycol | 20 parts |
| Water | 76 parts |

EXAMPLE 4

Of the dyes enumerated in specific examples, the dyes of the following numbers having sulfonic groups in all the benzene rings and naphthalene rings were used, and the inks of the present invention having the compositions shown below were prepared similarly as in Example 1, and by use of a recording device having an on-demand type multi-head (ejection orifice diameter: 35 μm, resistance of heating resistor: 150Ω, driving voltage: 30 V, frequency: 2 KHz) which performs recording by giving thermal energy to the ink to generate droplets, the items (T1)-(T5) were investigated similarly as in Example 1. Excellent results were obtained in all the experiments.

| | |
|---|---|
| Dye | 3 parts |
| Diethylene glycol | 20 parts |
| N—methyl-2-pyrrolidone | 10 parts |
| Polyethylene glycol (molecular weight: 300) | 10 parts |
| Water | 57 parts |

Dye: (1-2), (1-7), (1-12), (1-18), (1-27), (2-1), (2-10), (2-14), (3-1), (3-3), (4-1)

As described above, by use of the ink of the present invention, the following advantages can be obtained:

(1) long term storage stability, particularly thermal stability of the liquid is good, whereby clogging of the ejection outlet will not easily occur;

(2) allowance ranges of the fluctuation in temperature or driving conditions are broad for stable ejection;

(3) fixing onto a recording medium is rapid, and the image obtained is sharp;

(4) water resistance and light resistance of the printed matter are good;

(5) safety of the ink is high, without corrosion of surrounding materials (vessel, sealing material, etc.); and so on.

What we claim is:

1. A recording liquid comprising:
an aqueous liquid containing 0.1 to 20% weight of a recording agent having a molecular structure containing three structural units linked together through one or two linking groups, said structural units being represented by the formula

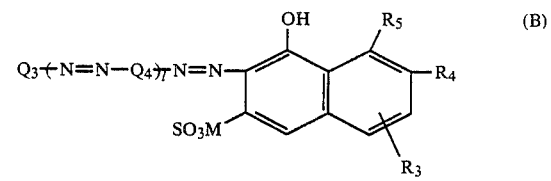

wherein $Q_3$ and $Q_4$ independently represent a benzene ring or a naphthalene ring which may have a substituent, $R_3$ represents hydrogen or a sulfonic group, $R_4$ and $R_5$ are independently selected from the group consisting of hydrogen, amino

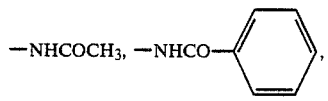

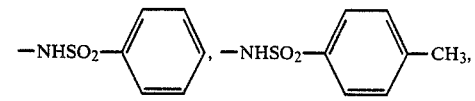

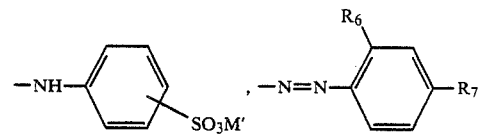

wherein ($R_6$ and $R_7$ independently represent hydrogen, amino, monoethanolamino, acylamino, alkyl, or a sulfonic group),

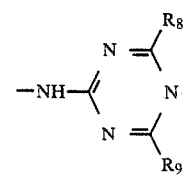

wherein ($R_8$ and $R_9$ independently represent hydroxyl, amino, monoethanolamino or diethanolamino), and $l$ represents 0 or 1; said linking group being represented by the formula (Y): —(CH$_2$)$_q$—, —NHCONH—, —NHCO—, —O—, —SO$_2$—, —NHCO(CH$_2$)$_r$CONH—, —NH—,

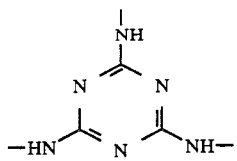

(wherein q and r are integers from 1-6)
wherein, the sulfonic group and a carboxylic group in said structural units form a salt with a base selected from the group consisting of alkali metals, ammonia and organic amines.

2. A recording liquid according to claim 1 wherein the structural units are selected from the group of the dye residues represented by the formula (B), and the linking group is

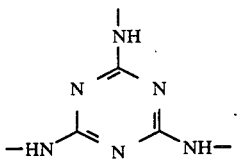

3. A recording liquid according to claim 1, wherein all the benzene rings or naphthalene rings in the molecule of the recording agent have one or more sulfonic groups.

4. The recording liquid of claims 1 or 2, wherein said recording agent is present between 0.5 and 15 percent by weight based on the total weight of the ink.

5. The recording liquid of claim 4 wherein said recording agent is present between 1 and 10 percent by weight based on the total weight of the ink.

6. The recording liquid of claim 1 wherein the water-soluble organic solvent is present between 5 and 95 percent by weight based on the total weight of the recording liquid.

7. The recording liquid of claim 6, wherein the water-soluble organic solvent is 10 to 80 percent by weight based on the total weight of the recording liquid.

8. The recording liquid of claim 7 wherein the water-soluble organic solvent is 20 to 50 percent by weight based on the total weight of the recording liquid.

9. The recording liquid of claim 1 wherein water comprises 10 to 90 percent by weight based on the total weight of the recording liquid.

10. The recording liquid in claim 9 wherein water comprises 10 to 70 percent by weight based on the total weight of the recording liquid.

11. The recording liquid in claim 10 wherein water comprises 20 to 70 percent by weight based on the total weight of the recording liquid.

* * * * *